(12) United States Patent
Budinski et al.

(10) Patent No.: US 8,232,011 B2
(45) Date of Patent: Jul. 31, 2012

(54) METHOD OF OPERATING A FUEL CELL STACK

(75) Inventors: Michael K. Budinski, Pittsford, NY (US); Craig S. Gittleman, Rochester, NY (US); Yeh-Hung Lai, Webster, NY (US); Christopher Lewis, Rochester, NY (US); Daniel Miller, Victor, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1301 days.

(21) Appl. No.: 11/551,358

(22) Filed: Oct. 20, 2006

(65) Prior Publication Data

US 2007/0122662 A1 May 31, 2007

Related U.S. Application Data

(60) Provisional application No. 60/731,804, filed on Oct. 31, 2005.

(51) Int. Cl.
*H01M 8/06* (2006.01)
*H01M 8/04* (2006.01)
*H01M 8/10* (2006.01)

(52) U.S. Cl. ........ 429/409; 429/413; 429/428; 429/479; 429/491

(58) Field of Classification Search .......... 429/408–428, 429/479–491
See application file for complete search history.

(56) References Cited

U.S. PATENT DOCUMENTS

| | | | | |
|---|---|---|---|---|
| 7,659,017 | B2 * | 2/2010 | Yip et al. | 429/12 |
| 2003/0157397 | A1 * | 8/2003 | Barton et al. | 429/44 |
| 2003/0235737 | A1 | 12/2003 | Jeon et al. | |
| 2004/0115517 | A1 * | 6/2004 | Fukuda et al. | 429/44 |
| 2006/0121322 | A1 * | 6/2006 | Haas et al. | 429/13 |
| 2006/0154124 | A1 | 7/2006 | Fowler et al. | |
| 2007/0059581 | A1 * | 3/2007 | Andrin | 429/38 |

OTHER PUBLICATIONS

Mathias; Mark F., et al. Two Fuel Cell Cars in Every Garage? Fall 2005; 12 pages.

* cited by examiner

*Primary Examiner* — Karie O'Neill Apicella
(74) *Attorney, Agent, or Firm* — BrooksGroup

(57) ABSTRACT

One aspect of the invention includes the discovery that pinholes in the membrane of the membrane electrode assembly may be caused by hygroexpansive ratcheting. In one embodiment of the invention, a fuel cell stack including a plurality of cells each having a membrane electrode assembly each including a membrane manufactured by an extrusion method and operated so that the rate of drying during humidity cycling is sufficiently low to reduce or eliminate build up stresses in the membrane electrode assembly.

41 Claims, 9 Drawing Sheets

METHOD OF OPERATING A FUEL CELL STACK

CROSS-REFERENCE TO RELATED APPLICATIONS

This Application claims the benefit of U.S. Provisional Application No. 60/731,804 filed Oct. 31, 2005.

TECHNICAL FIELD

The present invention relates to a method, and more particularly, to a method of operating a fuel cell stack.

BACKGROUND

One of the key challenges in the race to commercialize fuel cells for vehicle applications is developing membrane electrode assemblies (MEAs) that can meet industry durability targets. Polymer electrolyte membranes (PEMs) are the most promising membranes for automotive applications. These membranes serve to conduct protons from the anode electrode to the cathode electrode of the fuel cell while preventing the crossover of reactant gases, hydrogen and oxygen. State-of-the-art PEM fuel cells for high power density operations utilize perfluorosulfonic acid (PFSA) membranes that are typically about 25 microns thick or less. To be successful in automotive applications, these membranes must survive tenures of vehicle operation or 5500 hours of operation including transient conditions and start-stop and freeze-thaw cycles. The requirements on the chemical and mechanical stability of these thin membranes are significantly more demanding compared to the thicker membranes (100-200 µm) used in the past. Fuel cells cannot operate effectively if even small amounts of these gases are allowed to permeate through the membrane through, for example, microscopic pinholes in the membrane. Ultimately, fuel cells fail because such pinholes develop and propagate within the polymer membranes.

SUMMARY OF EXEMPLARY EMBODIMENTS

One embodiment of the invention includes the discovery that pinholes in the membrane of the membrane electrode assembly may be caused by hygroexpansive ratcheting. In one embodiment of the invention includes a fuel cell stack including a plurality of cells each having a membrane electrode assembly each including a membrane manufactured by an extrusion method and operated so that the rate of drying during humidity cycling is sufficiently low to reduce or eliminate the build up of stresses in the membrane electrode assembly. In one embodiment, the rate of drying $\delta\lambda/\delta$ time is less than 0.2 $\lambda$/sec. Lamda ($\lambda$) as used herein is defined as the number of water molecules per unit proton in the ionomer ($H_2O/H^+$)—physically, it is the level of hydration.

In one embodiment of the invention a fuel cell stack includes a membrane electrode assembly and bipolar plates constructed and arranged so that the planar aerial hygroexpansion of the membrane is less than 25% during a humidity cycle ranging from 80° C. dry to 80° C. wet.

In another embodiment of the invention a fuel cell stack includes a plurality of cells each having a membrane electrode assembly wherein the membrane is manufactured from an extrusion process. Although the scope of invention is not bound by theory, it is believed that the extruded membranes perform better than cast membranes because the extrusion process results in a homogeneous distribution of sulfonic acid functional groups and/or because of the resultant molecular/morphological alignment of the extruded polymer structure.

Another embodiment of the invention includes operating a fuel cell stack so that the magnitude of the humidity cycle is less than 100% with an amplitude of no more than 20% relative humidity.

In another embodiment of the invention a fuel cell is operated at a temperature not exceeding 60° C.

In one embodiment of the invention the fuel cell includes a membrane electrode assembly including electrode layers that are substantially free of cracks. In another embodiment of the invention the electrode layers are substantially free of heterogeneous defects such as platinum or carbon agglomerations.

In another embodiment of the invention, a fuel cell stack includes a membrane electrode assembly having a membrane and electrodes on opposite sides thereof, a microporous layer over each of the electrodes and a diffusion media over each of the microporous layers.

One embodiment of the invention includes operating the fuel cell stack under conditions that minimize chemical thinning of the ionomer in the membrane via peroxide-induced free radical depolymerization. In one embodiment of the invention the fuel cell stack is operated so as to minimize cycling to high potentials such as 300 mV of OCV under low membrane humidification.

Another embodiment of the invention minimizes any gap between the catalyst layer of a membrane electrode assembly and a protective layer or gasket layer to less than 50 microns.

Another embodiment of the invention includes a continuous interface between the catalyst layer and the membrane, particularly for catalyst coated diffusion media.

Another embodiment of the invention includes compressing the compressible components of the fuel cell uniformly so that the membrane electrode assembly is prevented from buckling between the lands of bipolar plates.

Other embodiments of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF EXEMPLARY EMBODIMENTS

The following description of the preferred embodiment(s) is merely exemplary in nature and is in no way intended to limit the invention, its application, or uses.

During operation, PEM fuel cells will see temperatures ranging from subzero to 100° C. and a variety of humidification levels including exposure to liquid water. As the PFSA membranes absorb water they undergo significant volumetric swelling. Nafion® NR-111 (25 μm solution-cast) absorbs 50 Wt % of water at 100° C., and undergoes 10% and 15% linear expansion at 23° C. and 100° C. respectively. Upon dehydration, PFSA membranes shrink to smaller than their original size. For example Nafion® shrinks by about 7% and 11% from its initial area upon dehydration after soaking in water at 80° C. and 100° C. respectively. These membranes will experience tensile, compression and shear stresses as their dimensions change in constraint fuel cell architectures with fluctuations in temperature and humidity levels. The membranes also experience other stresses during fuel cell operation. For example, membranes are compressed between sheets of carbon based diffusion media at pressures up to 3.5 MPa. As with other engineering materials, mechanical fatigue can reduce the membrane strength over time, leading to mechanical membrane degradation and reduced fuel cell durability.

Furthermore, the glass transition temperature for perfluorosulfonic acid membranes such as Nafion® occurs within fuel cell operating temperatures ranging from 60-100° C. Thus, the polymer experiences structural as well as dimensional changes during fuel cell operation. Perfluorosulfonic acid membranes are susceptible to chemical attack by peroxide radicals, which subsequently impact the mechanical integrity of the membrane.

Figure 1:
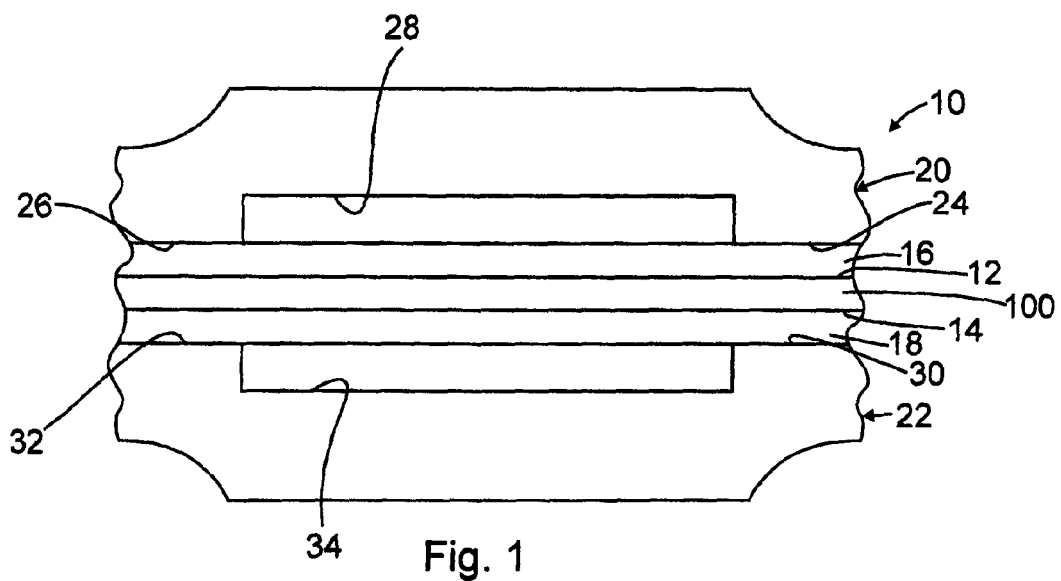
FIG. 1 illustrates a step in hygroexpansion ratcheting discovered in the course of developing an embodiment of this invention.

One embodiment of the invention includes the discovery that pinholes in the membrane of a membrane electrode assembly may be caused by hygroexpansive ratcheting. The process of hygroexpansive ratcheting of a membrane electrode assembly is illustrated in FIGS. 1-5. Referring now to FIG. 1, a fuel cell stack 10 includes a fuel cell unit which includes a membrane electrode assembly that includes an ionic membrane 100 having a first face 12 and an opposite second face 14, and a first catalyst layer 16 overlying the first face 12 and a second catalyst layer 18 overlying the second face 14. For example, the first catalyst layer 16 may serve as an anode and the second catalyst layer 18 may serve as a cathode. A first bipolar plate 20 overlies the first catalyst layer 16. A variety of additional layers may optionally be interposed between the bipolar plate 20 and the first catalyst layer 16. The first bipolar plate 20 includes a reactant gas flow field defined in part by a first land 24 and a second land 26 separated by a channel 28. A second bipolar plate 22 is provided over the second catalyst layer 18, and again, additional optional layers may be interposed between the second bipolar plate 20 and the second catalyst layer 18. The second bipolar plate 22 includes a reactant gas flow field defined in part by a first land 30 and a second land 32 separated by a channel 34.

Figure 2:
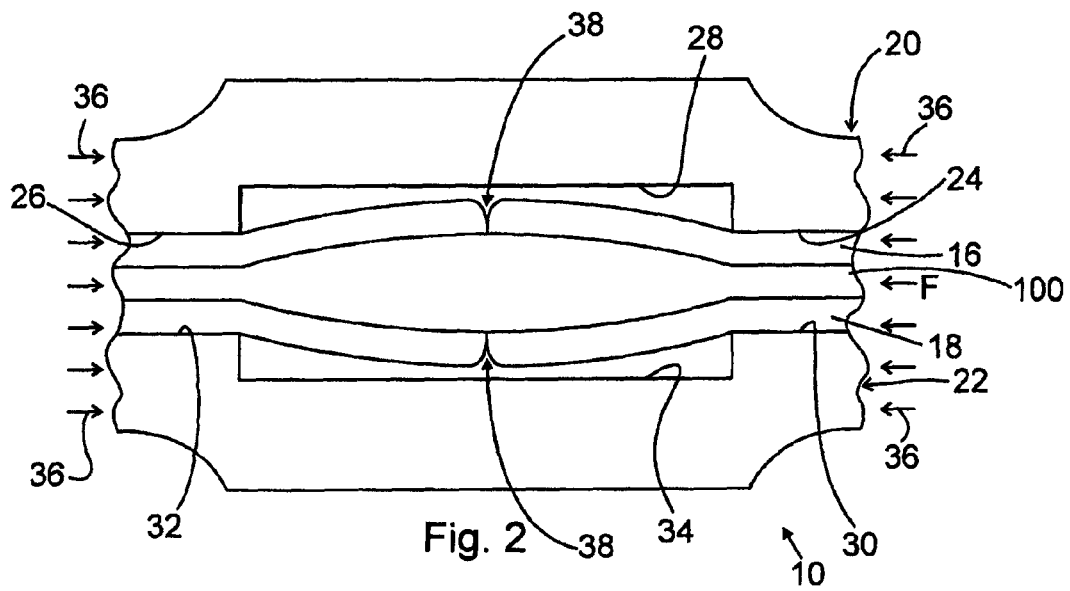
FIG. 2 illustrates a step in hygroexpansion ratcheting discovered in the course of developing an embodiment of this invention.

Referring now to FIG. 2, the membrane electrode assembly which includes the ionic membrane 100 and the first catalyst layer 16 and the second catalyst layer 18 swells during a wet state operation of the fuel cell. The electrode membrane assembly, most particularly the ionic membrane 100, swells primarily in the thickness direction because the planar constraints such as those provided by the lands 24, 26, 30 and 32 cause planar compressive stresses. A force F is exerted on the membrane electrode assembly in an inward direction indicated by arrows 36 towards the center of the channels 28 and 34 of the bipolar plates 20 and 22 respectively. The upheaval of the ionic membrane 100 causes the catalyst layers 16 and 18 to form cracks 38 therein.

Figure 3:
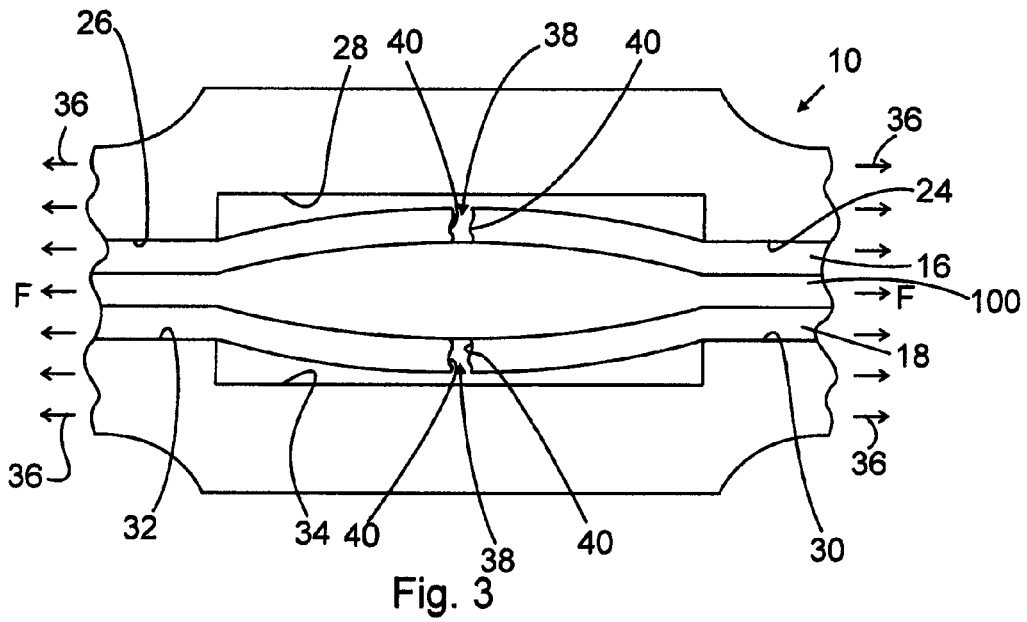
FIG. 3 illustrates a step in hygroexpansion ratcheting discovered in the course of developing an embodiment of this invention.

Referring now to FIG. 3, when the humidity in the fuel cell is reduced or the fuel cell is in a dry state, the membrane electrode assembly shrinks, particularly the ionic membrane 100. A force F is exerted on the membrane electrode assembly, as it shrinks, in a outwardly direction as indicated by arrows 36 away from the center of the channels 28 and 34 and towards the points of compression applied between the lands 26 and 32 and the lands 24 and 30. The cracks 38 in the first catalyst layer 16 and the second catalyst layer 18 widens to expose separation ends 40 in each of the catalyst layers 16 and 18.

Figure 4:
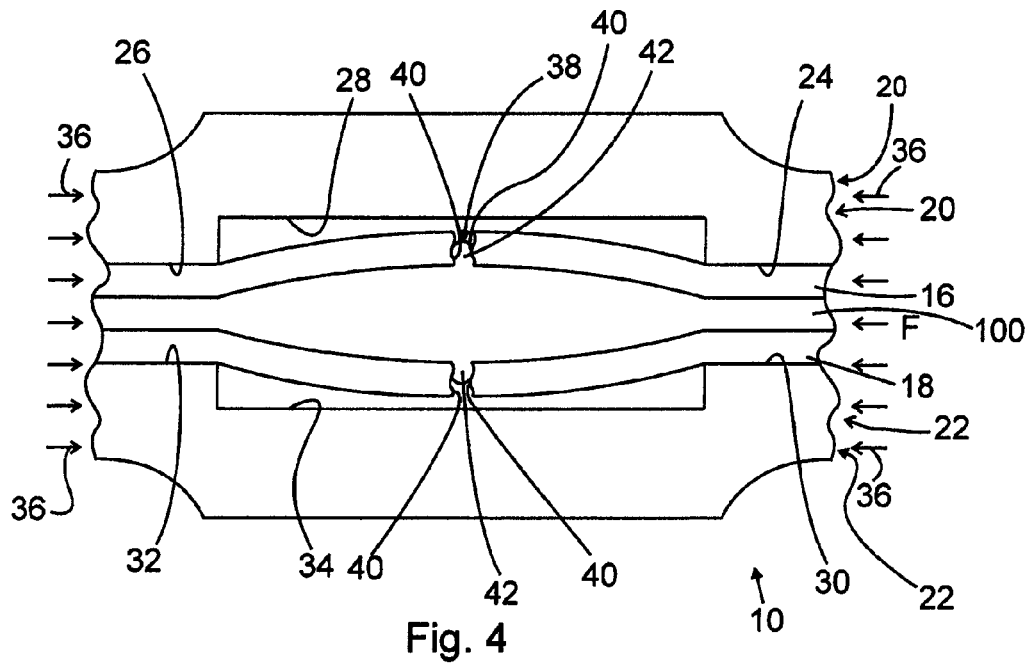
FIG. 4 illustrates a step in hygroexpansion ratcheting discovered in the course of developing an embodiment of this invention.

Referring now to FIG. 4, when the fuel cell is operated again in a humidified state, the membrane electrode assembly, particularly the ionic membrane 100 swells and a protuberance 42 of the ionic membrane 100 extends into the crack 38 between the separation ends 40 of the first catalyst layer 16 or the second catalyst layer 18. As the membrane electrode assembly swells a force F is exerted on the membrane electrode assembly inwardly in the direction of arrows 36 towards the center of the channels 28 and 34.

Figure 5:
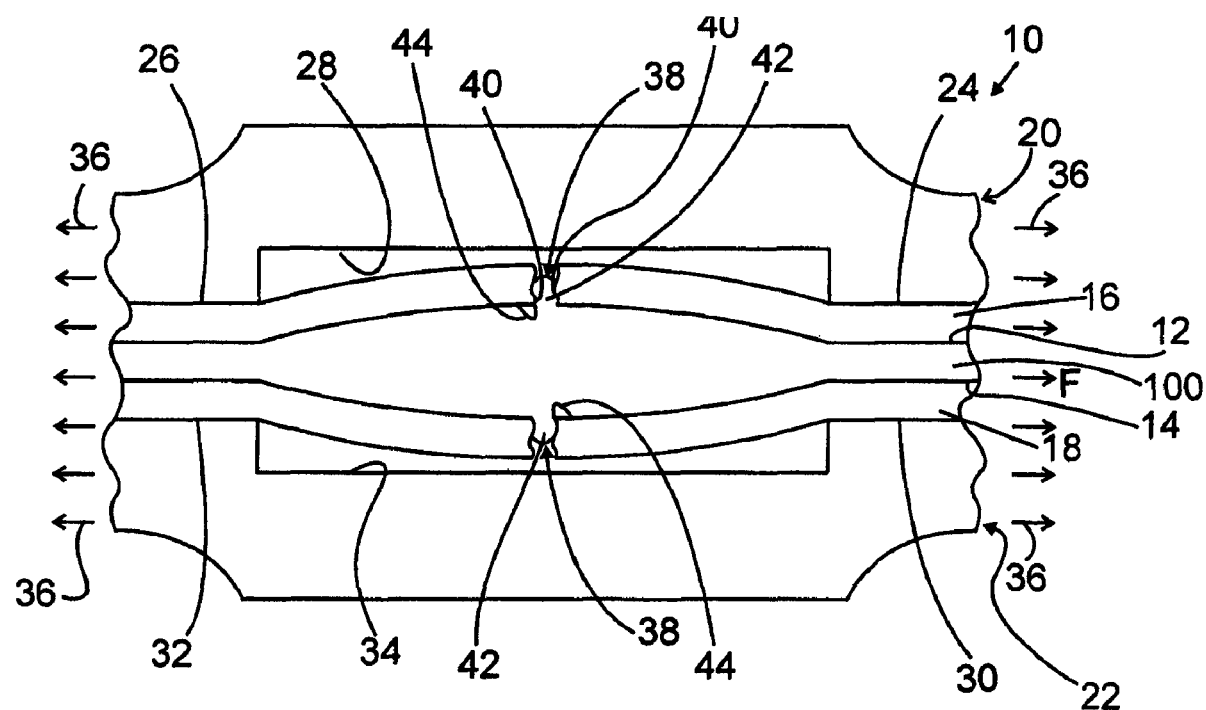
FIG. 5 illustrates a step in hygroexpansion ratcheting discovered in the course of developing an embodiment of this invention.

Referring now to FIG. 5, as the humidity in the fuel cell is reduced or the fuel cell is in a dry state, the membrane electrode assembly including the ionic membrane 100 shrinks. A force F is exerted on the membrane electrode assembly, particularly the ionic membrane 100, in an outward direction as indicated by arrows 36 away from the centers of the channels 28 and 34 and towards the points of compression between lands 26 and 32 of the first bipolar plate 20, and lands 24 and 30 of the second bipolar plate 22. The protuberance 42 is trapped between the separation ends 40 of each of the first catalyst layer 16 and second catalyst layer 18 as the membrane 100 continues to shrink. As a result, a tear 44 may develop in the ionic membrane 100. The tears 44 may eventually extend through the thickness of the ionic membrane 100. That is, pinholes may develop through the thickness of the ionic membrane 100.

The invention includes the discovery that pinhole development in the ionic membrane may be significantly reduced or eliminated utilizing an ionic membrane produced from an extrusion process. These extruded membranes are superior in performance and durability as will be appreciated from the following.

A variety of membranes were subjected to cyclic stresses by intermittently flowing wet and dry inert gases over the membrane in a non-operating fuel cell. Membrane electrode assemblies with anode and cathode platinum loadings of 0.5 mg/mc² were built in 50 mc² cells using flow fields with 2 mm wide straight channels separated by 2 mm wide lands. The membrane electrode assemblies were compressed between two pieces of commercially available carbon fiber gas diffusion media. The cycle consisted of flowing 2.0 SLPM of 50% HR air over both the anode and cathode sides of the membrane electrode assembly for two minutes followed by flowing 2.0 SLPM of dry air over both sides of the cell for two minutes. The tests ran isothermically at 80° C. with no backpressure. To ensure that any failures that occurred were induced solely by mechanical stresses, no hydrogen gas was used and no current was drawn from the cell during the test. Membrane failure was determined by periodically measuring the flow of air across the membrane with a 3 psi pressure applied to one side of the cell.

The mechanical properties of the membrane were also evaluated. Data was collected for both the machine and transverse direction for all samples. Tensile tests were conducted using ASTM method D882. The tests were conducted at 23° C. and 50% RH using a 25 mm wide sample with 50 mm between the grips and a loading rate of 500 mm/min. Tests were also conducted with the membrane submerged in the ionized water at 80° C. Tear tests were conducted using ASTM method D624 (Die B). The tests were conducted at 23° C. and 50% HR with a loading rate of 50 mm/min. The peak load and the energies to break are determined as described in the ASTM procedures. Averages and standard deviations for both the tensile and tear tests were based on five replicate samples.

The dimensional stability of the PFSA membranes were measured as well. The membranes were cut into 200 mm×125 mm sheets. The membranes were equilibrated at 23° C. and 35% RH overnight before recording the initial dimensions. The membranes were then dried at 80° C. for one hour and the dimensions were measured. The membranes were subsequently soaked in the deionized water at 80° C. for two hours and the dimensions were measured again. The membranes were then dried again at 80° C. for one hour and the dimensions were measured. Finally the membranes were allowed to equilibrate at 23° C. and 35% RH overnight before recording the final dimensions.

There are a variety of PFSA membranes available with equivalent weights ranging from 700-1100. The membrane processing method can also vary. DuPont manufactures a solution-cast form of a hydrolyzed Nafion® 1100 EW 25 µm membranes as NR-111 (currently sold as NRE-211). Ion Power, Inc., manufactures an alternative form of hydrolyzed Nafion® 1100 EW 25 µm membranes as N111-IP. Both these Nafion® membranes are homogenous and are made using 1100 EW Nafion®. There are also other methods of mechanically reinforcing PFSA membranes. For example, WL Gore manufactures expanded polytetrafluoethylene (ePTFE) micro reinforced composite PFSA membranes under the Gore Primea® product line. These reinforced membranes have been shown to have improved tear resistance and dimensional stability compared to homogeneous membranes.

Figure 6:
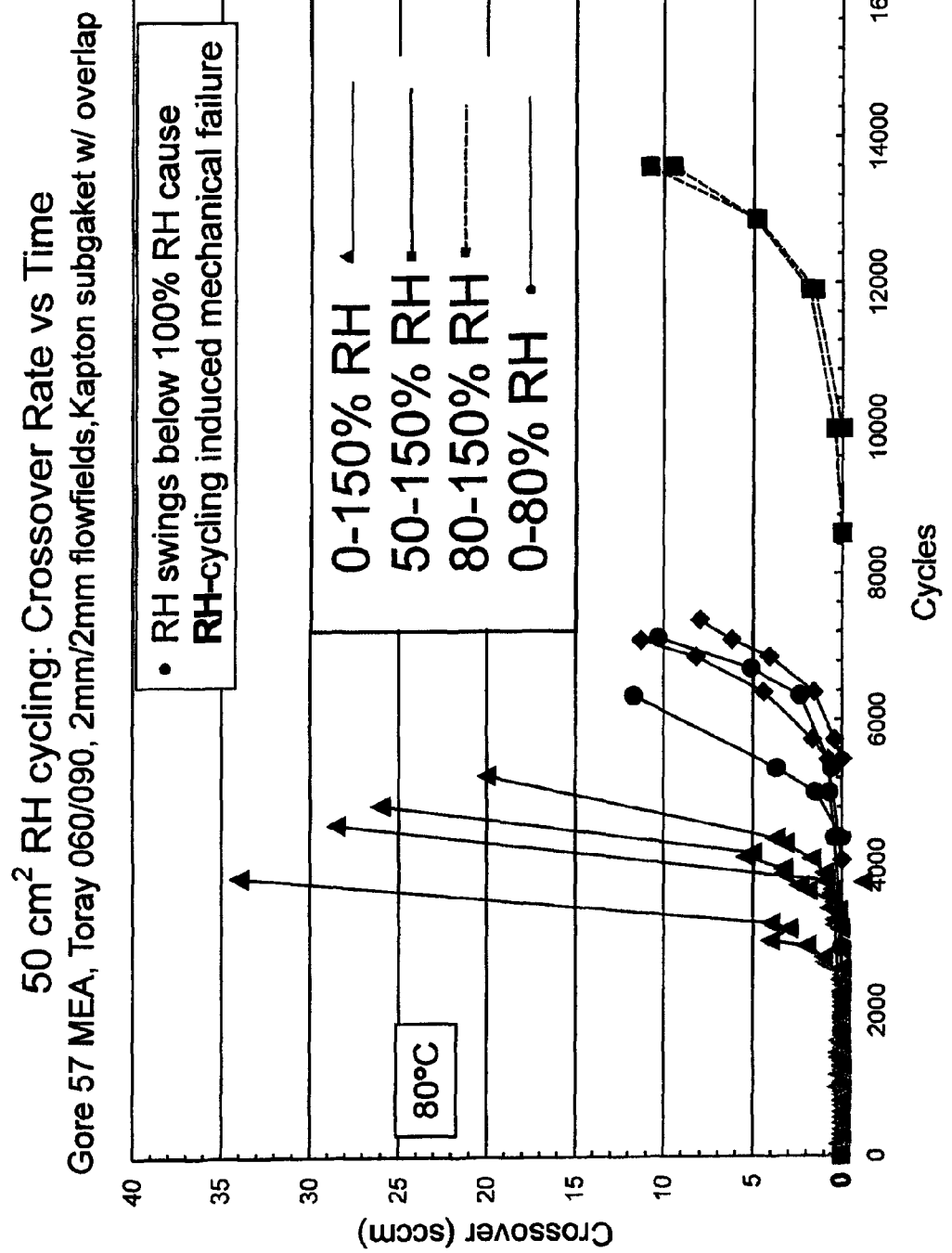
FIG. 6 is a graphic illustration of the crossover leak as a function of the number of humidity cycles during inert RH cycling for several membranes.

Homogeneous DuPont NR-111, the homogeneous Ion Power N111-IP and the composite Gore Primea® series 57 membranes were tested for durability under inert relative humidity cycling conditions described above. Two cells were run for each type of membrane electrode assembly. The progression of crossover leak as a function of the number of humidity cycles is shown in FIG. 6. Failures in these tests were defined as 10 sccm crossover. The NR-111 fails after about 400 cycles, whereas after 20,000 cycles there is no detectable leak in the N111-IP membrane. Composite Gore Primea® membrane electrode assembly fails due to crossover between 6,000-7,000 cycles. These results indicate that the mechanical reinforcement is not sufficient to prevent mechanical failure caused by humidity cycling.

Mechanical properties of membranes used were measured to determine if there was any correlation between these properties and the results of the humidity cycling tests. Tensile test results of NR-111, N111-IP and Gore Primea® membranes are shown in Table 1 below. Tensile strength, yield strength, elongation at break and Young's Modulus are reported. None of these properties stands out as significantly different for the N111-IP compared to the other membranes that would suggest that N111-IP would exhibit superior durability in the humidity cycling test.

TABLE 1

| Membrane | unit | NR-111 MD | +/- | TD | +/- | N111-IP MD | +/- | TD | +/- | Gore™ Primea® MD | +/- | TD | +/- |
|---|---|---|---|---|---|---|---|---|---|---|---|---|---|
| 50% RH, 23° C. | | | | | | | | | | | | | |
| Tensile Strength | MPa | 30.5 | 3.9 | 28.0 | 3.0 | 32.6 | 3.6 | 37.5 | 4.0 | 35.0 | 1.4 | 32.3 | 3.3 |
| Yield Strength (2% offset) | MPa | 14.4 | 0.0 | 14.0 | 0.2 | 14.1 | 0.6 | 14.9 | 0.2 | 18.0 | 0.5 | 15.6 | 0.8 |
| Elongation | % | 253 | 49 | 235 | 36 | 176 | 19 | 141 | 20 | 196 | 37 | 147 | 29 |
| Young's Modulus | MPa | 272 | 21 | 253 | 17 | 304 | 8 | 319 | 7 | 324 | 51 | 340 | 19 |
| submerged, 80° C. | | | | | | | | | | | | | |
| Tensile Strength | MPa | 8.9 | 2.9 | 9.5 | 2.1 | 17.2 | 5.5 | 16.1 | 8.4 | 18.4 | 0.7 | 15.1 | 0.8 |
| Yield Strength (2% offset) | MPa | 4.4 | 0.3 | 4.6 | 0.2 | 5.0 | 5.0 | 5.3 | 0.4 | 5.2 | 0.2 | 4.1 | 0.1 |
| Elongation | % | 159 | 127 | 188 | 117 | 193 | 81 | 127 | 90 | 153 | 22 | 157 | 26 |
| Young's Modulus | MPa | 23.9 | 3.8 | 25.1 | 5.1 | 45.0 | 5.6 | 51.5 | 4.2 | 58.0 | 2.7 | 28.3 | 1.7 |

Figure 7:
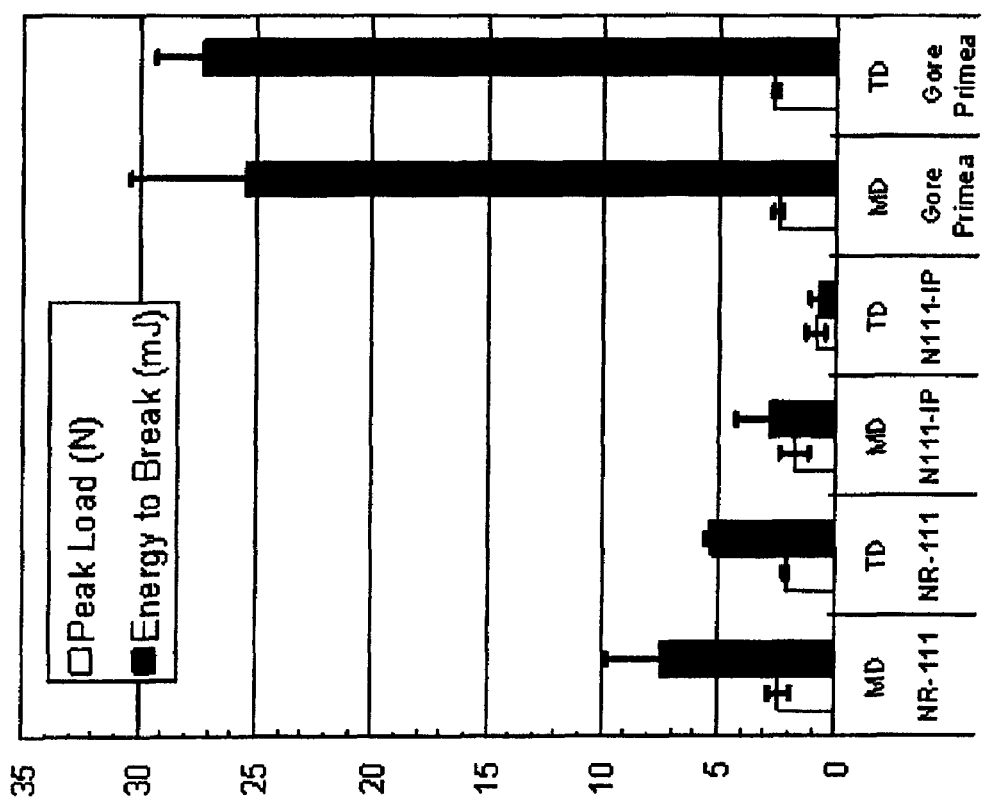
FIG. 7 is the graphic illustration of a tear test for several membranes.

The tear test results are summarized in FIG. 7. The peak load and the energy to break the membranes are recorded. It was found that the Nafion® N111-IP exhibits the lowest peak load and the smallest energy to break of these three membranes tested. Thus, its superior durability and the humidity cycling test cannot be attributed to better tear resistance. Also, the composite Gore Primea® membrane is the most tear resistant. This enhancement in tear resistance has been attributed to the ePTFE reinforcement.

Figure 8:
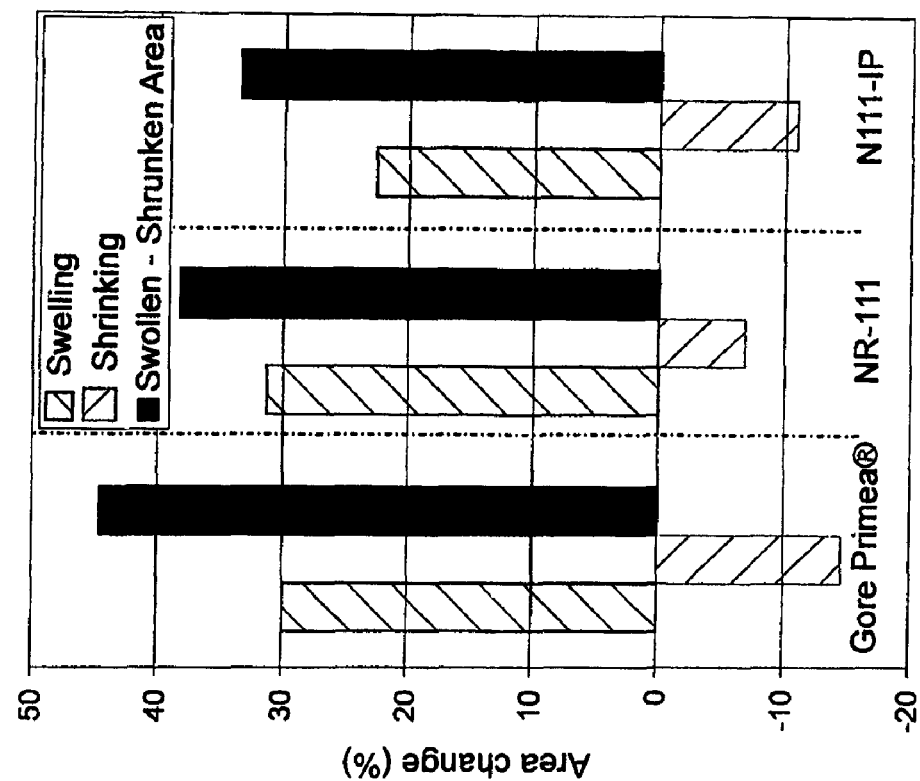
FIG. 8 is a graphic illustration of the result of dimensional stability testing performed on several membranes.

The results of the dimensional stability tests are shown in FIG. 8. The percent swell is defined as the area change from the initial dimensions to those measured after soaking for two hours at 80° C. The percent shrink is defined as the area change from the initial dimensions to those measured after drying for one hour at 80° C. after the soak which are recorded as negative values. The percent swollen-shrunken is defined as the area change from the swollen dimensions after soaking for two hours at 80° C. to the shrunken dimensions after drying for one hour at 80° C. The Nafion N111-IP exhibits the smallest amount of swelling when submerged at 80° C. and also the smallest difference in area change between the swollen and the shrunken states.

Figure 9:
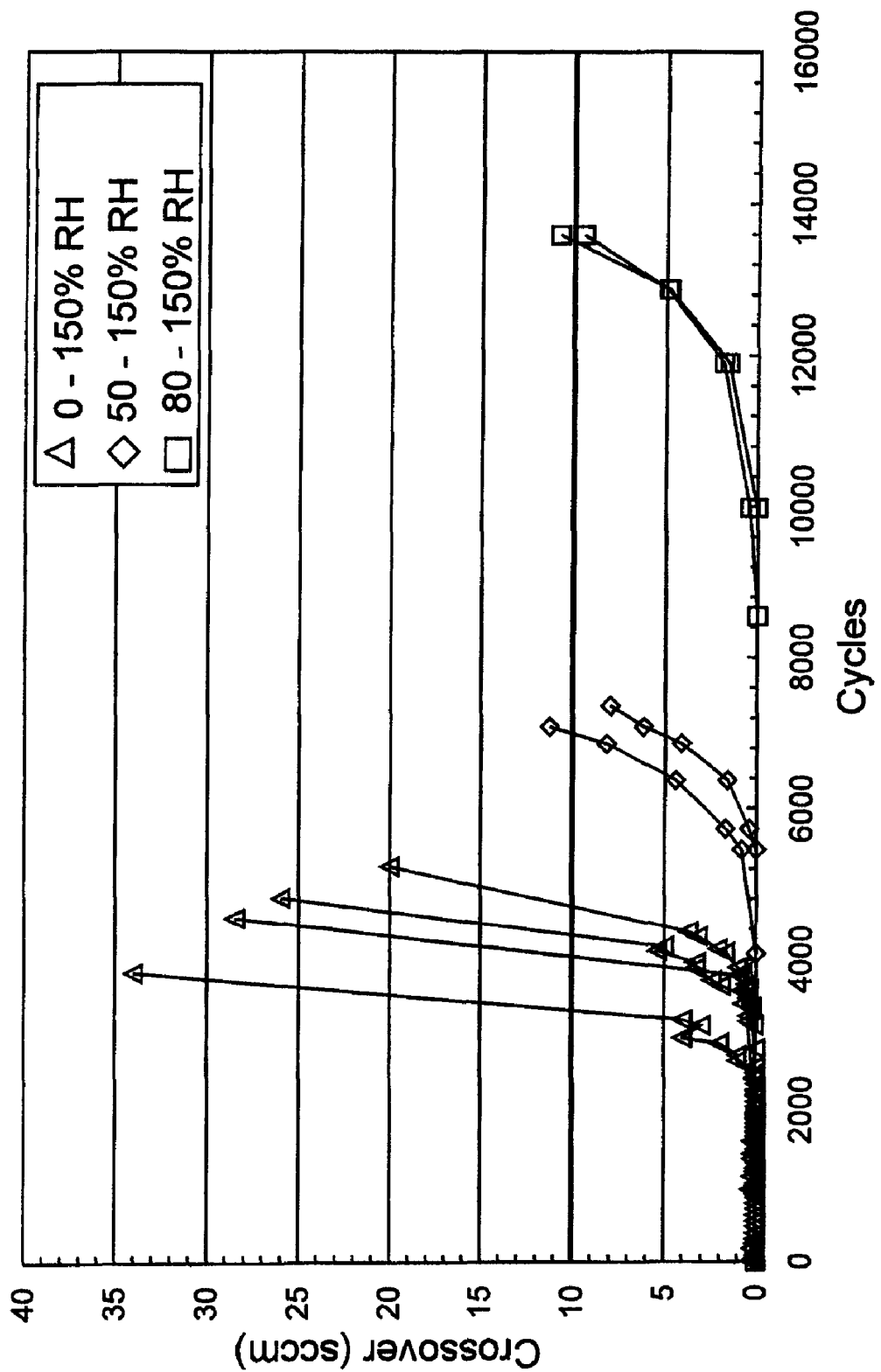
FIG. 9 is a graph illustrating crossover leak as a function of number of humidity cycles for a membrane.

The above illustrates that cycling between bone-dry operations and exposure to liquid water causes mechanical failure of some of the PFSA membranes. However, under expected operating conditions of a fuel cell, the membranes may never be completely dried out. Therefore, the impact of humidity cycling without completely drying out the membranes was examined. FIG. 9 shows results of humidity cycling of Gore Primea® membrane electrode assemblies from either 0%, 50%, or 80% relative humidity to supersaturated conditions. In these tests, the relative humidity cycle consist of 2.5 minutes at 150% relative humidity followed by 3.5 minutes at drier conditions. All tests were conducted at 80° C. and no backpressure. The time to crossover failure increased from 4000 to 7000 to 14000 cycles and the magnitude of the relative humidity swing is decreased. The results indicate that the smaller the magnitude of humidity swing, the longer the life of the membrane. However, even relatively small humidity swings, such as from 80% relative humidity to liquid water, will eventually lead to mechanical membrane failure. These types of relative humidity swings would certainly be expected during fuel cell operations.

While PFSA membranes are chemically very stable they are known to degrade in the fuel cell environment via peroxyl-radical attack, strongly enhanced by the presence of trace ion contamination. The mechanism is quite complicated, depending on ionomer structure, ion level, catalyst components, electrode design, relative humidity, temperature and other factors.

To evaluate the impact of chemical degradation on membrane mechanical failure, in-situ 50 cm² relative humidity cycling tests have been conducted with reactive gases ($H_2$ and air) and at a constant current density of 0.1 A/cm². In these tests both the anode and cathode stoichiometries were 20 to enable essentially uniform relative humidity throughout the cell. The other conditions were identical to our inert gas test (2 min., 0% RH feed/2 min., 150% RH feed, 80° C., 0 kPag). Failure in these tests was identified at 10 sccm crossover leak. The results for both homogeneous 25 µm Nafion® 1100 EW membranes and the reinforced Gore Primea® membrane electrode assemblies are shown in Table 2 below. For all membranes, operation at 0.1 A/cm² significantly accelerates membrane failure. The failure times for the DuPont NR-111 and the Gore Primea® membrane electrode assemblies are reduced by a factor of 5 relative to the inert humidity cycling test. The Ion Power N111-IP did not run to failure in the inert test, but developed crossover leaks after 1800 humidity cycles at 0.1 A/cm², indicating at least a ten-fold lifetime reduction. Clearly chemical degradation of PFSA membranes causes mechanical weakening.

TABLE 2

Comparison of RH cycling with inert gases at 0.1 A/cm²

| MEA | Cycles to Failure w/o load | Cycles to Failure @ 0.1 A/cm² |
| --- | --- | --- |
| DuPont ™ Nafion ® (NR-111) | 4000-4500 | 800-1000 |
| Ion Power ™ Nafion ® (N111-IP) | 20000+ | 1800 |
| Gore ™ Primea | 6000-7000 | 1300 |
| DuPont ™ Nafion ® (NR-111) | 4000-4500 | 800-1000 |
| Ion Power ™ Nafion ® (N111-IP) | 20000+ | 1800 |
| Gore ™ Primea | 6000-7000 | 1300 |

Figure 14:
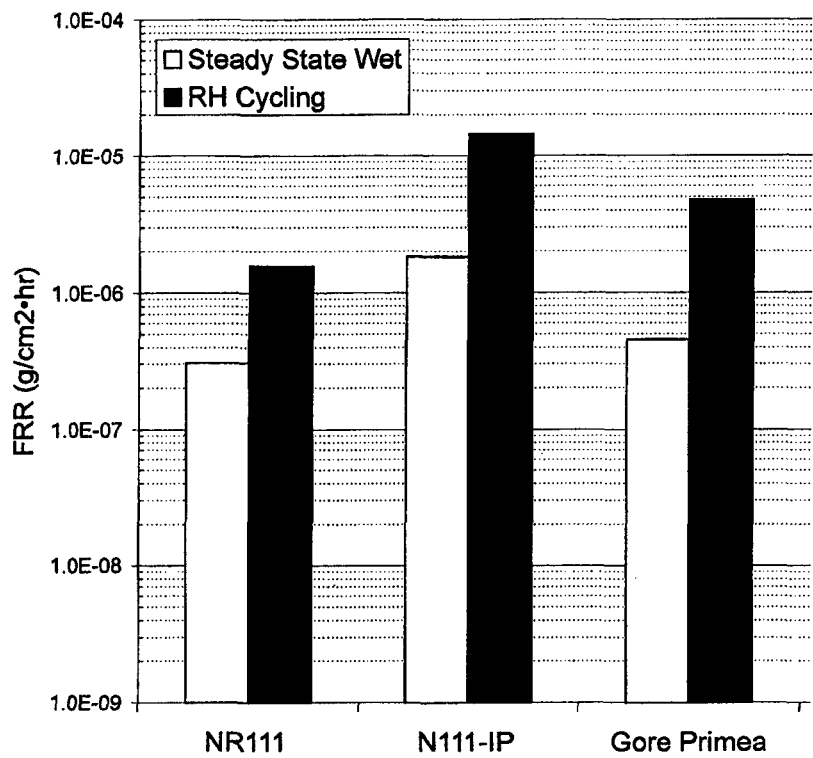
FIG. 14 is graph illustrating the amount of fluoride released during steady state and RH cycling operation for various membranes.

In order to quantify the magnitude of chemical degradation during these tests, the water exhausted from the fuel cell was collected and the fluoride composition was measured using ion exchange chromatography. It is well known that hydrogen fluoride (HF) is a byproduct of oxidative degradation of PFSA polymers (*Journal of Power Sources*, Volume 131, Issues 1-2, 14 May 2004, Pages 41-48, Curtin et al). Thus, an indication of the degree of membrane degradation can be determined by measuring the HF content in the water exhausted from the fuel cell. At the beginning of these tests, each cell was run at constant feed conditions with fully humidified inlets for 24 hours. Water was also collected during this 24 hour period of steady state operation and the fluoride composition was measured using ion exchange chromatography. The amount of fluoride released during steady state and RH cycling operation of the cells are compared in FIG. 14. The results in FIG. 14 show that for all three membranes tested the fluoride release rate (FRR) is approximately 10 times higher during RH cycling than during steady state operation. These results indicate that the degree of chemical degradation of PFSA membranes is accelerated by RH cycling.

Thus it is recommended that RH cycling be avoided especially during conditions known to accelerate the attack of PFSA polymers. At the conditions of the experiments described above, the cell potential was generally above 700 mV. Additional experiments have shown that chemical degradation of PFSA membranes increases with increasing cell potential (E. Endoh, S. Terazano, H. Widjaja, Y. Takimoto, Electrochem. Solid-State Lett. 7, A209-A 211). Efforts should be made to limit RH swings when operating a fuel cell at potentials above 700 mV.

Figure 10:
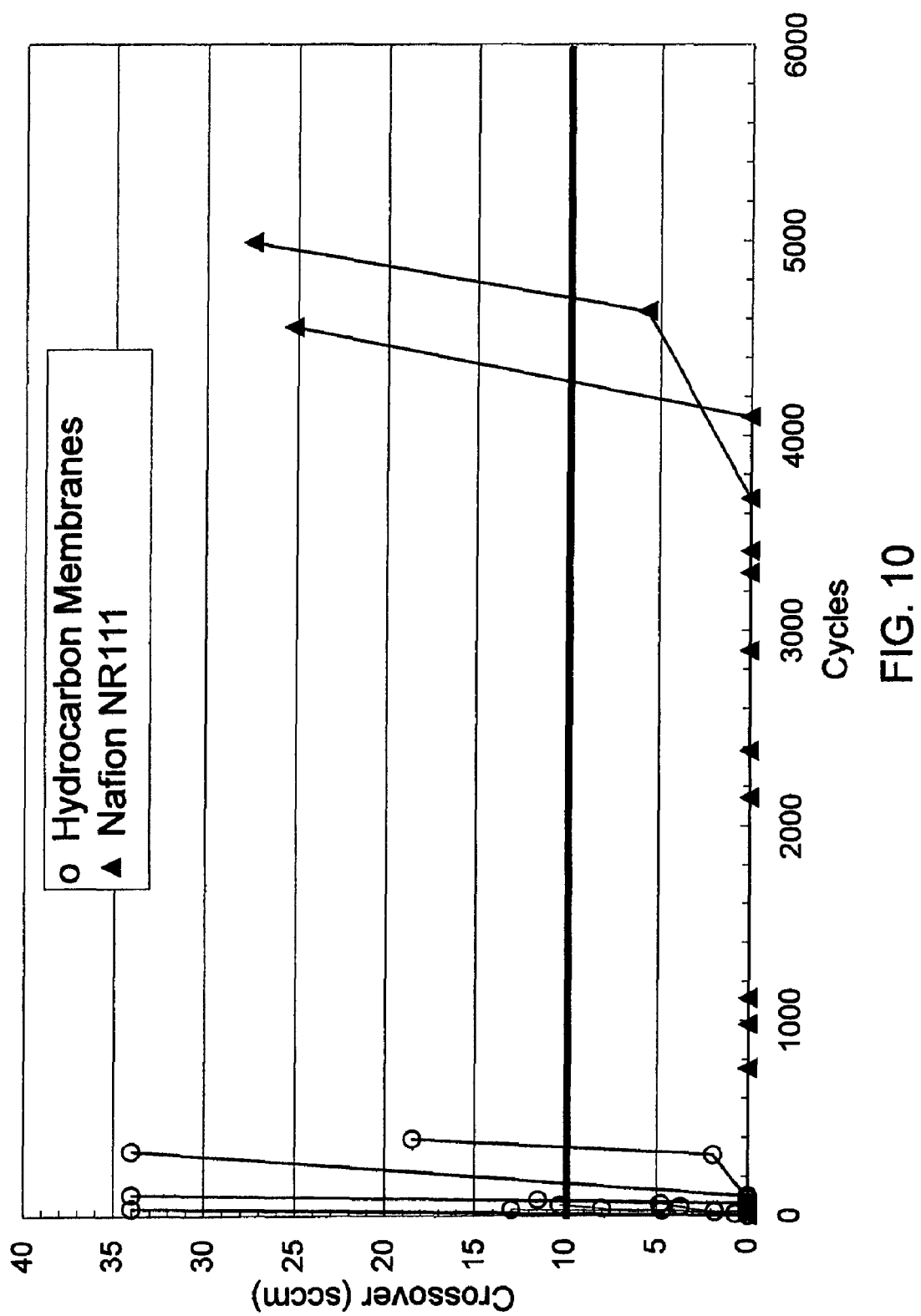
FIG. 10 is a graph illustrating the results of a test of the crossover leak as a function of the number of humidity cycles during inert RH cycling of a PTFE, hydrocarbon and partially fluorinated hydrocarbon membranes.

Tests were also run on a variety of hydrocarbon and partially-fluorinated hydrocarbon proton-conductive membranes for mechanical durability. The results from the in-situ humidity cycling (0-150% relative humidity) test at 80° C. are shown in FIG. 10. None of the hydrocarbon or partially-fluorinated hydrocarbon polymer membranes lasted more than 400 cycles before developing a crossover leak. This is an order of magnitude lower than the least durable of the PFSA membranes.

Figure 11:
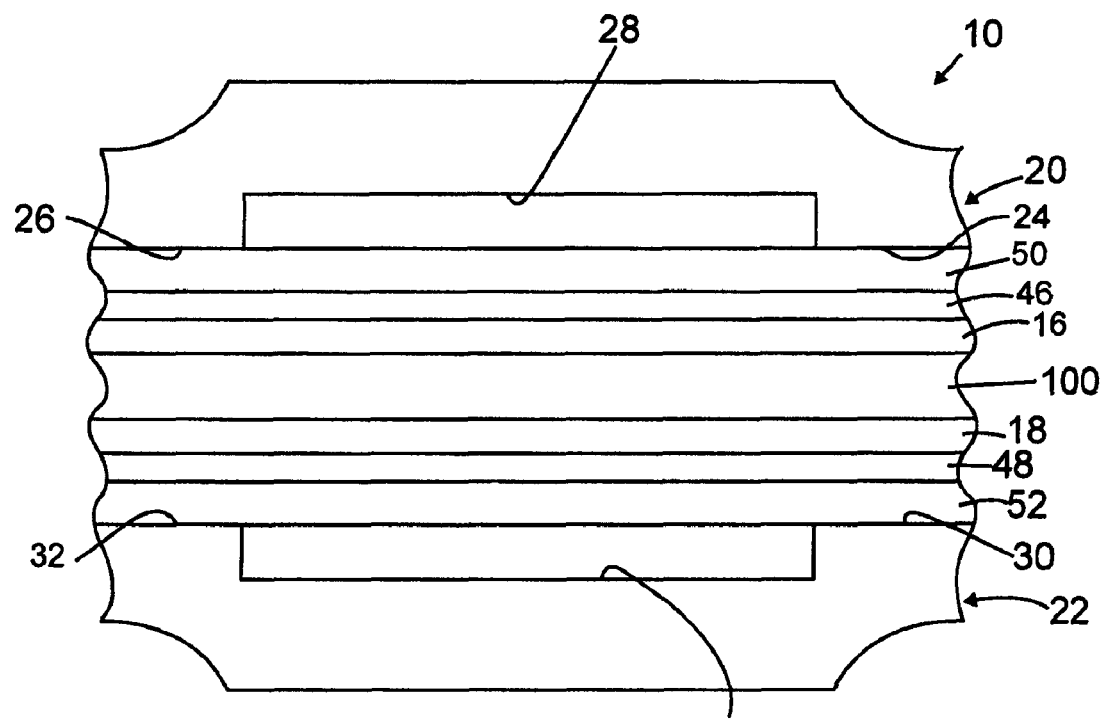
FIG. 11 illustrates a fuel cell according to one embodiment of the invention.
Figure 15:
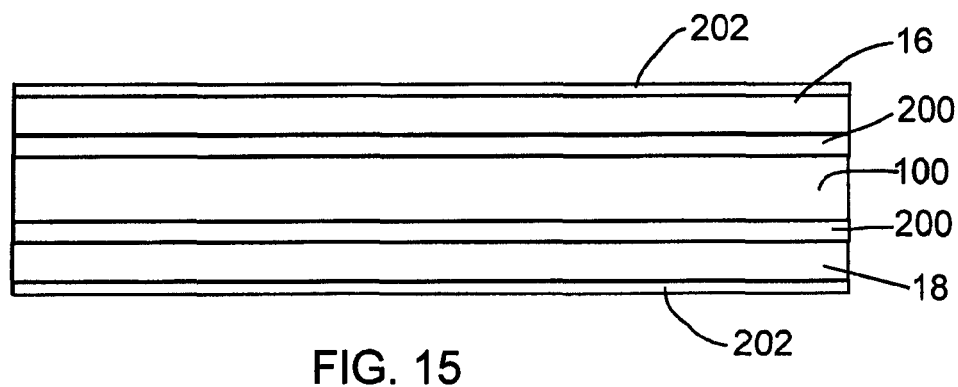
FIG. 15 illustrates another embodiment of the invention.

Referring to FIG. 11, one embodiment of the invention includes a fuel cell stack including a plurality of fuel cells 10 including an extruded ionic membrane 100 having a first catalyst layer 16 on one face thereof and a second catalyst layer 18 on a second face thereof. In one embodiment of the invention a first microporous layer 46 overlies the first catalyst layer 16 and similarly a second microporous layer 48 overlies the second catalyst layer 18. Alternatively, as shown in FIG. 15, a first conductive restrictive layer 200, such as a carbon paper or cloth layer, may be placed over or adhered to the membrane electrode assembly to limit the buckling of the MEA. Alternatively, the restrictive layer 200 may be, for example, a conductive epoxy layer. A second conductive restrictive layer 202, as an alternative to or in addition to the first conductive restrictive layer 200, may be placed over one or more of the catalyst layers 16, 18. The second conductive restrictive layer 202 may be made of the same materials as the first conductive restrictive layer 200. The catalyst layers 16, 18 are known in the art and may include an unsupported catalyst or a catalyst supported on particles, such as carbon, and further including an ionomer. Referring again to FIG. 11, a first gas diffusion media material 50 may overlie the first microporous layer 46 and a second gas diffusion media 52 may overlie the second microporous layer 48. A first bipolar plate 20 may overlie the gas diffusion media and a second bipolar plate 22 may overlie the second gas diffusion media 52.

Figure 12:
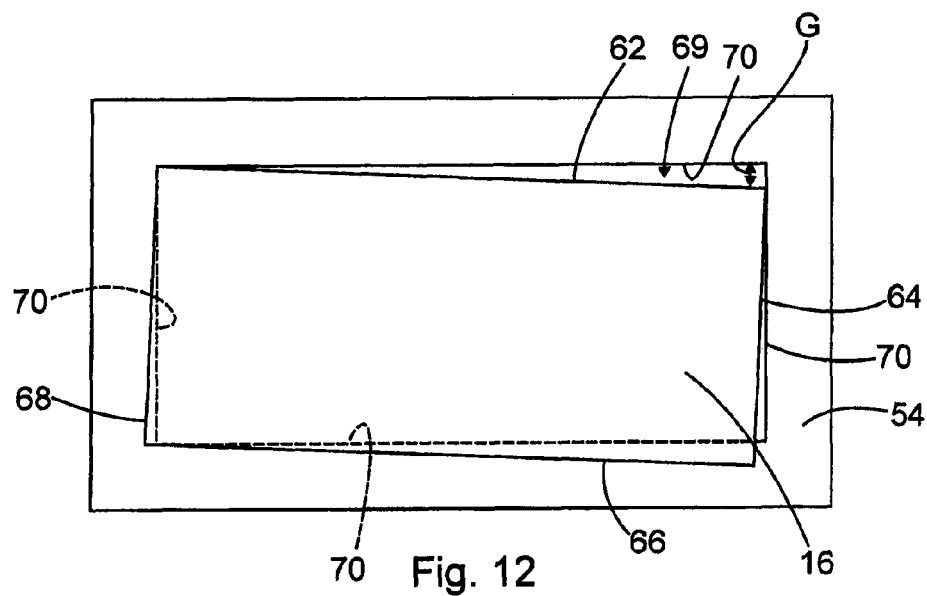
FIG. 12 illustrates portions of a fuel cell according to one embodiment of the invention.

Referring now to FIG. 12, another embodiment of the invention includes a fuel cell stack including a plurality of fuel cell units and wherein the fuel cell unit includes a first sealing gasket 54 having a window 69 extending therethrough and defined by a window edge 70. A first catalyst layer 16 may overlie or underlie the first sealing gasket 54. In one embodiment of the invention, a gap G between the window edge 70 and a side edge 62, 64, 66, 68 of the first catalyst layer 16 should be less than 50 microns and preferably no gap at all should exist.

Figure 13:
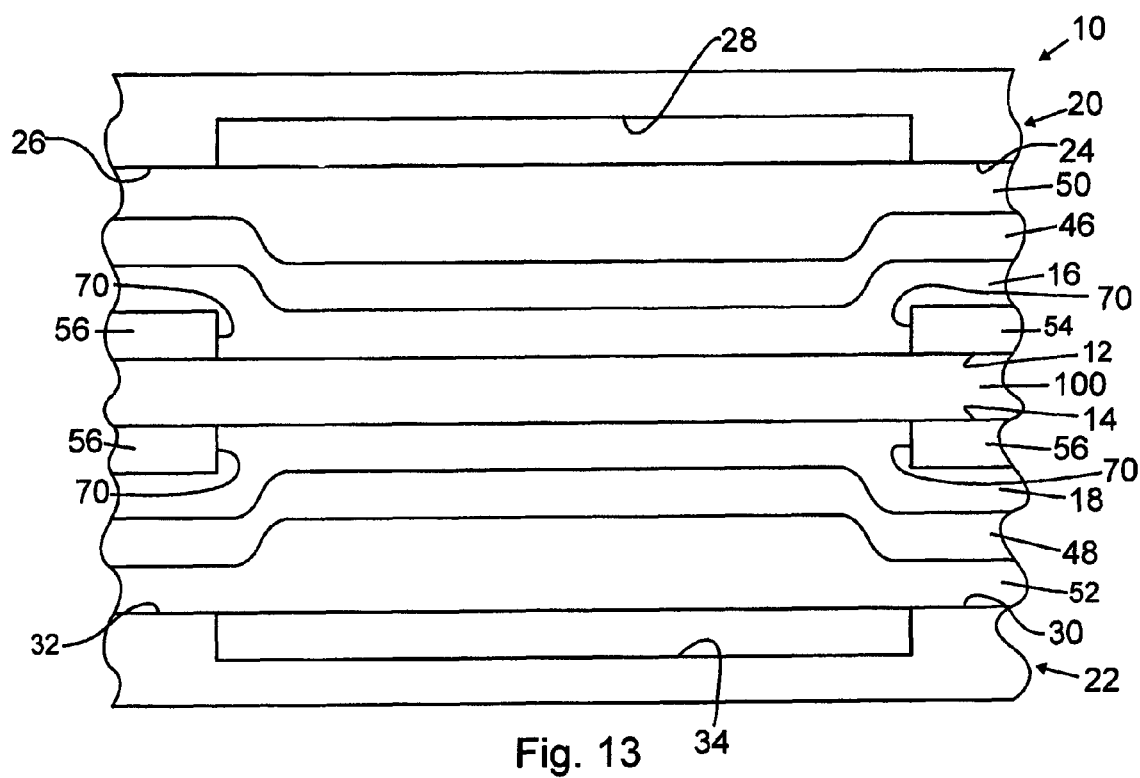
FIG. 13 illustrates a fuel cell according to one embodiment of the invention.

Referring now to FIG. 13, another embodiment of the invention includes a fuel cell stack 10 similar to that illustrated in FIG. 11, however in this case, a first sealing gasket 54 overlies a first face 12 of the ionic membrane 100 and a second sealing gasket 56 overlies the second face 14 of the ionic membrane 100. As indicated above, in an alternative embodiment, the first and second sealing gaskets 54, 56 may overlie the first catalyst layer 16 and second catalyst layer 18 respectively.

One embodiment of the invention includes operating a fuel cell wherein the rate of drying $\delta\lambda/\delta$ time is less than 0.2 $\lambda$ per second. Again, Lamda ($\lambda$) as used herein is defined as the number of water molecules per unit proton in the ionomer ($H_2O/H^+$)—physically, it is the level of hydration. The membrane mechanical life, determined by the number of cycles to reach gas crossover leak in RH cycling test, is directly related to membrane stress. In turn, membrane stress is a strong function of water content, dehydration rate, temperature, and heating/cooling rate. The relationship between membrane stress and fatigue life can be represented using a fatigue life curve, which as in common mechanical engineering practice is referred to as an S-N curve. According to the S-N curve, higher membrane stresses generally correspond to lower fuel cell durability. The present inventors have recognized that membrane stress can be minimized by properly controlling variables like membrane dehydration rate, water content, and temperature. By minimizing membrane stress, the membrane fatigue life can be prolonged. In the current invention, we have established an S-N curve for Gore Primea® MEA through a series of RH cycling tests under various test conditions which include different ranges of RH changes from hydrated to dehydrated states, range of cycling frequencies, and range of temperatures. The membrane stress for each condition was determined through a suitable membrane stress model. An example of a suitable membrane stress model which we developed is as follows:

$$\varepsilon_{ij}(\sigma, t, T, \lambda) = \frac{\delta_{ij}}{3}B \cdot s + \frac{3}{2}\int_0^t D(t-\xi)\dot{s}_{ij}(\xi)d\xi + \delta_{ij}\beta \cdot \Delta\lambda$$

where values for the membrane hydration $\lambda$, $\Delta\lambda$, the membrane temperature T, the coefficient of hygro expansion $\beta$, and the uniaxial creep compliance D are input from material tests and fuel cell system tests, and where $\lambda$, $\Delta\lambda$ represent the water content of the membrane in terms of the number of water molecules per acid site with an unit of $H_2O/H^+$, $\epsilon_{ij}$ is a strain tensor, $\sigma$ represents stress, t represents time, $\delta_{ij}$ is the Kronecker delta, B is the bulk creep compliance, s is the dilatational component of the applied stress, $s_{ij}$ is the deviatoric component of the applied stress, and $\xi$ is an integration variable representing time. See Third International Conference on Fuel Cell Science, Engineering and Tecnology, Ypsilanti, M I may 23-25, 2005 Yeh-Hung Lai, Viscoelastic Stress Model and Mechanical Characterization of Perfluorosulfonic Acid (PFSA) Polymer Electrolyte Membranes. FUEL-CELL2005-74120. The particulars of this membrane stress model are beyond the scope of the present invention and can be gleaned from a variety of suitable teachings on stress modeling. The model is presented here merely for illustrative purposes and should not be used to limit the scope of the present invention. Using the fatigue life curve, S-N curve, we have found that by carefully controlling the dehydration rate, we can significantly reduce the membrane stress, and therefore, prolong the membrane fatigue life. In a non-controlled RH cycling test condition of changing the gas flow humidity from 0% RH to 150% RH at 80° C. with a dwell time of 2 minutes at each humidity condition, the membrane has a fatigue life of about 6000 cycles. In this test condition, it is determined that the average membrane dehydration rate is about 0.2 $H_2O/H^+$ per second. By reducing the dehydration rate to 0.1 $H_2O/H^+$ per second, it has been determined that the membrane fatigue life increased by 57%. Furthermore, by reducing the dehydration rate to 0.05 $H_2O/H^+$ per second, we determined that the membrane fatigue life can be increased by 220%. The results are summarized in the table as follows.

| | Drying rate (H2O/H+ per second) Test | | |
|---|---|---|---|
| | 0.2 (Prior Art) | 0.1 | 0.05 |
| # Cycles to Crossover leak | 100% | 157% | 320% |

In one embodiment of the invention a fuel cell stack includes a membrane electrode assembly, and bipolar plates constructed and arranged so that the planar aerial hygroexpansion of the membrane is less than 25% during a humidity cycle ranging from 80 dry to 80° C. wet.

In another embodiment of the invention a fuel cell stack includes a plurality of membrane electrode assemblies wherein the membrane is manufactured from an extrusion process.

Another embodiment of the invention includes operating a fuel cell stack so that the magnitude of the humidity cycle is less than 50% RH and preferably no more than 20% RH. It is also preferable to avoid cycling between conditions where liquid water is prevalent and less than 100% RH.

In one embodiment of the invention the fuel cell includes a membrane electrode assembly including electrode layers that are substantially free of cracks. For example, the layers may include a number of cracks, provided that the number and size of the cracks do not adversely influence, to any significant extent, the cycles to failure of the membrane.

One embodiment of the invention includes operating the fuel cell stack under conditions that minimize chemical thinning of the ionomer in the membrane via hydroxyl-induced free radical depolymerization. In one embodiment of the invention the fuel cell stack is operated so as to minimize RH cycling at cell potentials greater than 700 mV.

Another embodiment of the invention includes compressing the compressible components of the fuel cell with at least 0.2 MPa of compression pressure between MEA and GDM over the channels and with at least a compression uniformity of 0.6 so that the membrane electrode assembly is adequately constrained from deformation and buckling between the lands of the bipolar plate flow field.

To reduce the resistance of proton conductivity in the membrane, it is normally desired to keep the polymer electrolyte membrane sufficiently hydrated. However, it is recognized that under typical operating conditions the MEA cycles through relatively wet and relatively dry states. These membrane hydration cycles are particularly prevalent during fuel cell start-up and shut-down operations and as power demand fluctuates during operation of the fuel cell. When the membrane is hydrated, the swelling in the membrane could introduce significant compressive stress that can lead to the buckling of MEA if compression pressure is not adequately applied between GDM and MEA. The buckling of the MEA can lead to the local over heating of material by significantly increasing electrical contact resistance, which can ultimately result in the formation of membrane pinholes and crossover of reactant gases. An example of increasing the membrane fatigue life using the RH cycling test compared to the prior art through the improvement in compression is summarized in the table as follows.

|  | (Lowest GDM/MEA compression over channels, Compression uniformity) Test | | |
| --- | --- | --- | --- |
|  | (0.15 MPa, 0.054) - Prior Art | (0.38 MPa, 0.27) | (0.76 MPa, 0.27) |
| Normalized Life | 100% | 124% | 180% |

In this table, the lowest compression pressure between the GDM and MEA over the channel is determined by a stress model such as, but not limited to, a finite element method. The compression uniformity is determined by taking the ratio of the lowest GDM/MEA compression pressure over the channel to the averaged cell compression, which is defined by the compression load divided by the active area. In the prior art design/method, the lowest compression pressure is determined to be 0.15 MPa and the compression uniformity is 0.054. By increasing the lowest GDM/MEA compression pressure to 0.38 MPa and by increasing the compression uniformity to 0.27, an increase of 24% in fatigue life can obtained. Furthermore, by increasing the lowest GDM/MEA compression pressure to 0.76 MPa and by increasing the compression uniformity to 0.27, we can increase the fatigue life by 80%.

In another embodiment of the invention, the above process may be conducted in fuel cell stacks that have an extruded membrane (e.g. extruded Nafion®) or hydrocarbon based membranes.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method comprising:
providing a fuel cell comprising a membrane and an anode catalyst and a cathode catalyst;
humidifying the fuel cell;
drying the fuel cell at a rate less than 0.2 $\lambda$/sec.

2. A method as set forth in claim 1 wherein the membrane comprises an extruded membrane.

3. A method as set forth in claim 1 wherein the membrane comprises an extruded membrane comprising a perfluorosulfonic acid.

4. A method as set forth in claim 1 wherein the membrane comprises a fluoropolymer.

5. A method as set forth in claim 1 wherein the membrane comprises a hydrocarbon polymer.

6. A method as set forth in claim 1 wherein the membrane comprises an extruded membrane so that there is a homogeneous distribution of sulfonic acid groups in the membrane.

7. A method as set forth in claim 1 wherein the fuel cell is operated at a temperature less than 60° C.

8. A method as set forth in claim 1 wherein each catalyst layer is substantially free of heterogeneous defects.

9. A method as set forth in claim 1 wherein each catalyst layer is substantially free of platinum or carbon agglomerations.

10. A method as set forth in claim 1 further comprising an electrically conductive restrictive layer over at least one of the anode catalyst layer and cathode catalyst layer to restrict the expansion of the membrane during the humidifying.

11. A method as set forth in claim 1 further comprising an electrically conductive microporous layer over at least one of the anode catalyst layer and cathode catalyst layer to restrict the expansion of the membrane during the humidifying.

12. A method as set forth in claim 1 further comprising an electrically conductive epoxy layer over at least one of the anode catalyst layer and cathode catalyst layer to restrict the expansion of the membrane during the humidifying.

13. A method as set forth in claim 1 further comprising restricting any voltage cycling to a peak less than 300 mV at relative humidity less than 30 percent.

14. A method as set forth in claim 1 wherein the fuel cell further comprises a subgasket having a window opening therethrough defined by a window edge and wherein any gap between one of the anode or cathode catalyst layers and the window edge is less than 50 microns.

15. A method as set forth in claim 1 wherein there is a continuous interface between at least one of the anode or cathode catalyst layers and the membrane.

16. A method as set forth in claim 1 wherein the fuel cell comprises compressible materials and wherein the compressible materials are compressed uniformly.

17. A method as set forth in claim 1 wherein the drying rate is equal to or less than 0.1 $\lambda$/sec.

18. A method as set forth in claim 1 wherein the drying rate is equal to or less than 0.05 $\lambda$/sec.

19. A method as set forth in claim 17 wherein each of the anode and cathode catalyst layer is substantially free of, heterogeneous defects.

20. A method comprising:
providing a fuel cell comprising a membrane and an anode catalyst and a cathode catalyst;
humidifying the fuel cell;
drying the fuel cell at a rate less than 0.2 λ/sec;
wherein the humidifying and drying of the fuel cell is carried out in a humidity cycle, and further comprising controlling the humidity cycle of the fuel cell so that the planar expansion of the membrane is less than 25% during the humidity cycle.

21. A method as set forth in claim 1 wherein the fuel cell includes a plurality of bipolar plates each having a reactant flow field defined by a plurality of lands and channels and a GDM/MEA position between adjacent bipolar plates, and further comprising operating the fuel cell so that the lowest GDM/MEA compression over the channels is equal to or greater than 0.38 MPa.

22. A method as set forth in claim 1 wherein the fuel cell includes a plurality of bipolar plates each having a reactant flow field defined by a plurality of lands and channels and a GDM/MEA position between adjacent bipolar plates, and further comprising operating the fuel cell so that the lowest GDM/MEA compression over the channels is equal to or greater than 0.76 MPa.

23. A method comprising:
providing a fuel cell comprising a membrane and an anode catalyst and a cathode catalyst;
humidifying and drying the fuel cell in a humidity cycle;
controlling the humidity cycle of the fuel cell so the planar expansion of the membrane is less than 25% during the humidity cycle.

24. A method as set forth in claim 23 wherein the membrane comprises an extruded membrane.

25. A method as set forth in claim 23 wherein the membrane comprises an extruded membrane comprising a perfluorosulfonic acid.

26. A method as set forth in claim 23 wherein the membrane comprises a fluoropolymer.

27. A method as set forth in claim 23 wherein the membrane comprises a hydrocarbon polymer.

28. A method as set forth in claim 23 wherein the membrane comprises an extruded membrane so that there is a homogeneous distribution of sulfonic acid groups in the membrane.

29. A method as set forth in claim 23 wherein the fuel cell is operated at a temperature less than 60° C.

30. A method as set forth in claim 23 wherein each catalyst layer is substantially free of heterogeneous defects.

31. A method as set forth in claim 23 wherein each catalyst layer is substantially free of platinum or carbon agglomerations.

32. A method as set forth in claim 23 further comprising an electrically conductive restrictive layer over at least one of the anode catalyst layer and cathode catalyst layer, restrictive layer being constructed and arranged to restrict the expansion of the membrane during the humidifying.

33. A method as set forth in claim 23 further comprising an electrically conductive microporous layer over at least one of the anode catalyst layer and cathode catalyst layer, the microporous layer being constructed and arranged to restrict the expansion of the membrane during the humidifying.

34. A method as set forth in claim 23 further comprising an electrically conductive epoxy layer over at least one of the anode catalyst layer and cathode catalyst layer to restrict the expansion of the membrane during the humidifying.

35. A method as set forth in claim 23 further comprising restricting any voltage cycling to a peak less than 300 mV at relative humidity less than 30 percent.

36. A method as set forth in claim 23 wherein the fuel cell further comprises a subgasket having a window opening therethrough defined by a window edge and wherein any gap between one of the anode or cathode catalyst layers and the window edge is less than 50 microns.

37. A method as set forth in claim 23 wherein there is a continuous interface between at least one of the anode or cathode catalyst layer and the membrane.

38. A method as set forth in claim 23 wherein the fuel cell comprises compressible materials and wherein the compressible materials are compressed uniformly.

39. A method as set forth in claim 23 wherein the magnitude of the humidity cycle is less than 100% with an amplitude of no more than 20% relative humidity.

40. A method comprising:
providing a fuel cell comprising a membrane and an anode catalyst and a cathode catalyst;
humidifying and drying the fuel cell in a humidity cycle;
controlling the humidity cycle of the fuel cell so the planar expansion of the membrane is less than 25% during the humidity cycle;
wherein the fuel cell is operated at a temperature less than 60° C.;
wherein the catalyst layers are substantially free of heterogeneous defects;
wherein the fuel cell further comprises an electrically conductive restrictive layer over at least one of the anode catalyst layer and cathode catalyst layer to restrict the expansion of the membrane during the humidifying;
restricting any voltage cycling to a peak less than 300 mV at relative humidity less than 30 percent.

41. A method comprising:
providing a fuel cell comprising a membrane and an anode catalyst and a cathode catalyst;
humidifying the fuel cell;
drying the fuel cell;
wherein the humidifying and drying of the fuel cell is carried out in a humidity cycle, and further comprising controlling the humidity cycle of the fuel cell so that the planar expansion of the membrane is less than 25% during the humidity cycle.

* * * * *